United States Patent
Botha et al.

(10) Patent No.: US 7,756,193 B2
(45) Date of Patent: Jul. 13, 2010

(54) TIME DIVIDED PILOT CHANNEL DETECTION PROCESSING IN WCDMA TERMINAL HAVING SHARED MEMORY

(75) Inventors: Louis Jacobus Botha, San Diego, CA (US); Frederic Christian Marc Hayem, San Diego, CA (US); Hendrik Johannes Conroy, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 867 days.

(21) Appl. No.: 11/524,585

(22) Filed: Sep. 21, 2006

(65) Prior Publication Data

US 2008/0075149 A1 Mar. 27, 2008

(51) Int. Cl.
*H04B 1/00* (2006.01)
(52) U.S. Cl. .................... 375/148; 375/141; 375/142; 375/130
(58) Field of Classification Search ................. 375/148, 375/141, 142, 130
See application file for complete search history.

(56) References Cited

U.S. PATENT DOCUMENTS

| 6,216,004 | B1 * | 4/2001 | Tiedemann et al. ......... 455/442 |
| 6,577,608 | B1 * | 6/2003 | Moon et al. ................. 370/311 |
| 6,950,456 | B2 * | 9/2005 | Lee et al. .................... 375/146 |
| 7,075,948 | B2 * | 7/2006 | Makarov ..................... 370/503 |
| 7,260,390 | B1 * | 8/2007 | Skinner et al. .............. 455/420 |
| 2001/0004377 | A1 * | 6/2001 | Lee et al. ..................... 375/141 |
| 2003/0099223 | A1 * | 5/2003 | Chang et al. ................. 370/342 |
| 2003/0220084 | A1 * | 11/2003 | Makarov ................. 455/226.1 |
| 2004/0081114 | A1 * | 4/2004 | Jiang et al. .................. 370/320 |
| 2005/0002442 | A1 * | 1/2005 | Litwin et al. ................ 375/142 |
| 2005/0157637 | A1 * | 7/2005 | Feng et al. ................... 370/203 |
| 2006/0270402 | A1 * | 11/2006 | Kubo ......................... 455/425 |

* cited by examiner

*Primary Examiner*—Mohammad H Ghayour
*Assistant Examiner*—Sarah Hassan
(74) *Attorney, Agent, or Firm*—Garlick, Harrison & Markison; Bruce E. Garlick

(57) ABSTRACT

A method for operating a Radio Frequency (RF) receiver of a wireless terminal. During a first time interval, an RF front end is enabled and the RF receiver receives and processes an RF signal, e.g., a Wideband Code Division Multiple Access (WCDMA) signal, to produce a baseband signal and to store samples of the baseband signal. During a second time interval that differs from the first time interval, the RF front end is disabled and the RF receiver processes the plurality of samples of the baseband signal of the first time interval to measure signal strengths of a plurality of pilot signals present in the baseband signal of the first time interval. Finally, during a third time interval that differs from the first time interval and the second time interval, the RF front end is enabled and the RF receiver receives and processes an RF signal of the third time interval to extract data there from. Memory is shared between the first, second, and third time intervals for different uses.

12 Claims, 8 Drawing Sheets

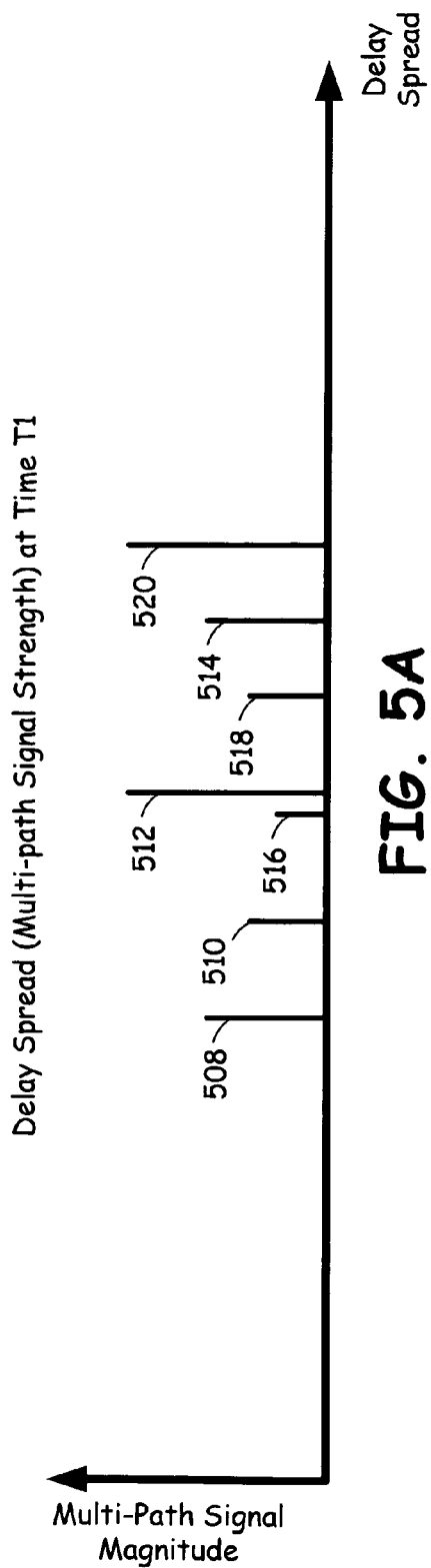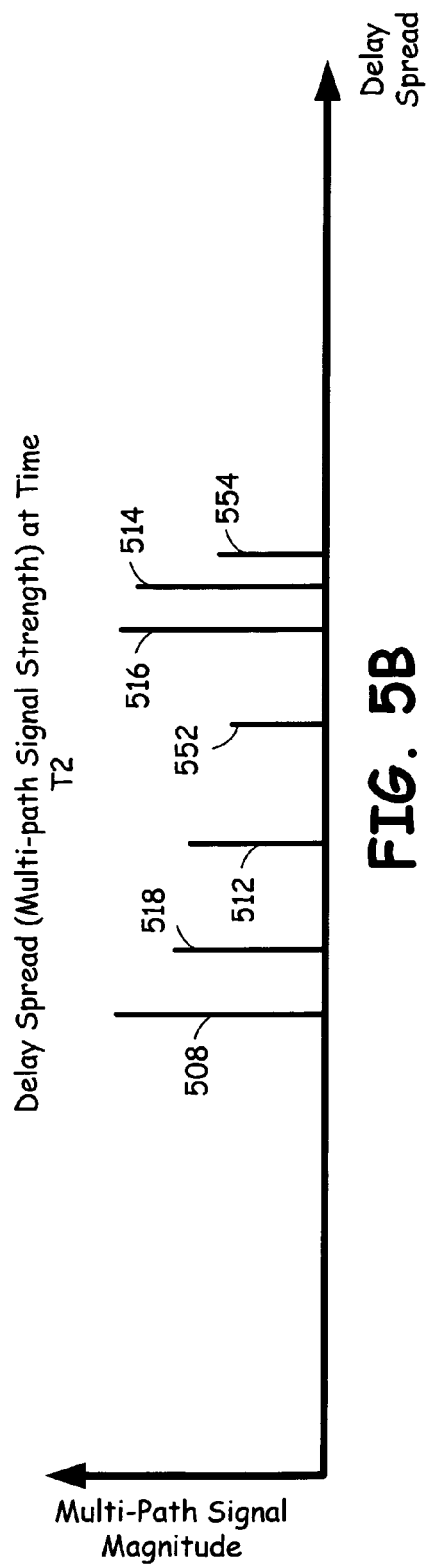

TIME DIVIDED PILOT CHANNEL DETECTION PROCESSING IN WCDMA TERMINAL HAVING SHARED MEMORY

BACKGROUND

1. Technical Field

The present invention relates generally to wireless communication systems; and more particularly to the processing of communications received by a wireless terminal in such a wireless communication system.

2. Related Art

Cellular wireless communication systems support wireless communication services in many populated areas of the world. Cellular wireless communication systems include a "network infrastructure" that wirelessly communicates with wireless terminals within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, each base station communicates with a plurality of wireless terminals operating in its serviced cell/sectors. A BSC coupled to the base station routes voice communications between the MSC and the serving base station. The MSC routes the voice communication to another MSC or to the PSTN. BSCs route data communications between a servicing base station and a packet data network that may include or couple to the Internet. Transmissions from base stations to wireless terminals are referred to as "forward link" or "downlink" transmissions while transmissions from wireless terminals to base stations are referred to as "reverse link" or "uplink" transmissions. The volume of data transmitted on the downlink typically exceeds the volume of data transmitted on the reverse link. Such is the case because data users typically issue commands to request data from data sources, e.g., web servers, and the web servers provide the data to the wireless terminals.

Wireless links between base stations and their serviced wireless terminals typically operate according to one (or more) of a plurality of operating standards. These operating standards define the manner in which the wireless link may be allocated, setup, serviced, and torn down. Popular currently employed cellular standards include the Global System for Mobile telecommunications (GSM) standards, the North American Code Division Multiple Access (CDMA) standards, and the North American Time Division Multiple Access (TDMA) standards, among others. These operating standards support both voice communications and data communications. More recently introduced operating standards include the Universal Mobile Telecommunications Services (UMTS)/Wideband CDMA (WCDMA) standards. The UMTS/WCDMA standard employs CDMA principles and support high throughput, both voice and data. As contrasted to the North American CDMA standard, transmissions within a UMTS/WCDMA system are not aligned to a timing reference, i.e., GPS timing reference. Thus, synchronization to a base station by a wireless terminal is more complicated in a WCDMA system than in a North American CDMA system. Cell searching, base station identification, and base station synchronization consumes significant processing resources. Such continuous operations can overload a baseband processing module causing degradation of performance and decrease battery life.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

FIG. 5A is a graph illustrating an example of a multi-path delay spread at a first time;

FIG. 5B is a graph illustrating the example of the multi-path delay spread of FIG. 5A at a second time;

Figure 1:
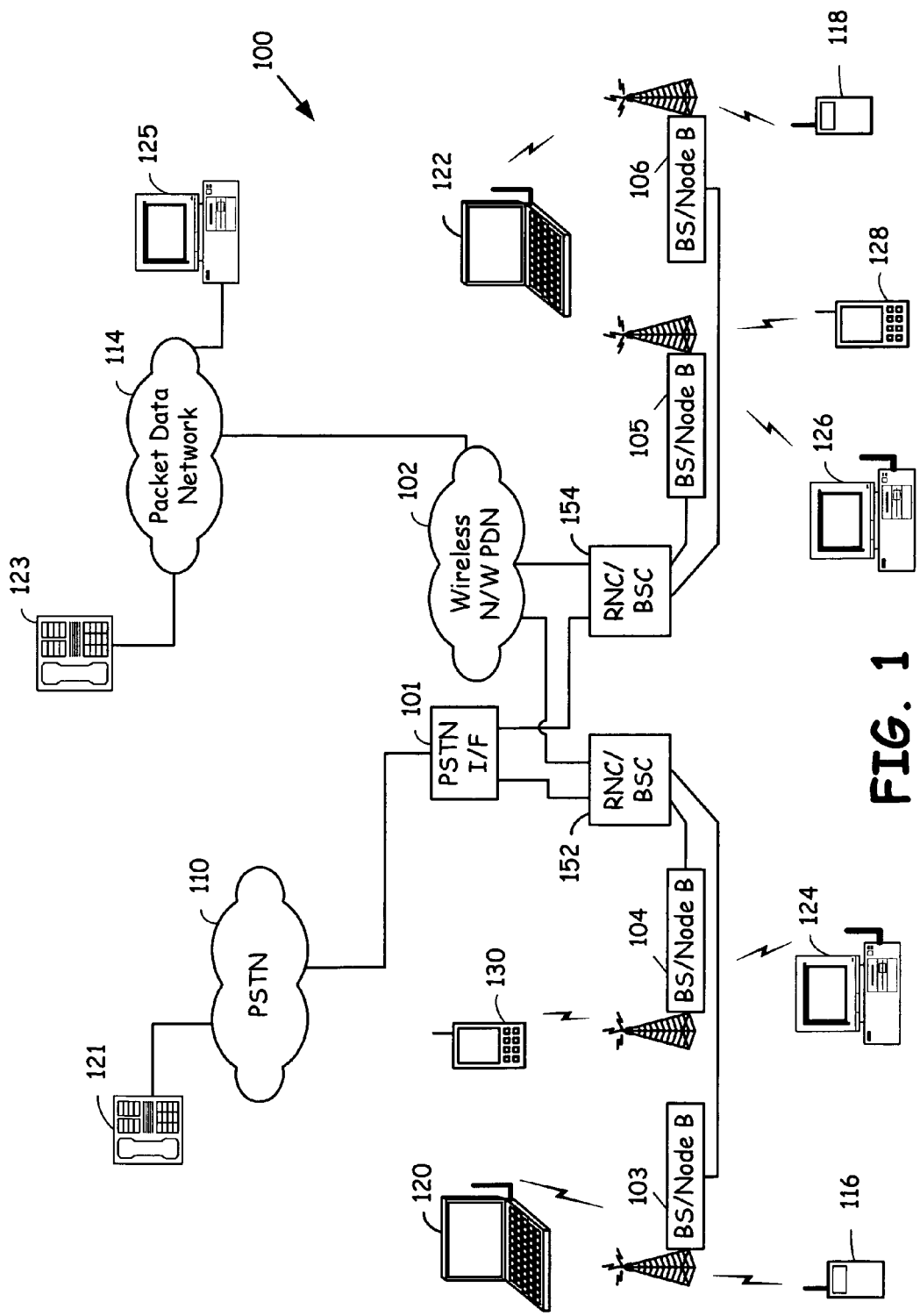
FIG. 1 is a system diagram illustrating a portion of a cellular wireless communication system that supports wireless terminals operating according to the present invention.

DETAILED DESCRIPTION OF THE DRAWINGS system 100 that supports wireless terminals operating according to the present invention. The cellular wireless communication system 100 includes a Public Switched Telephone Network (PSTN) Interface 101, e.g., Mobile Switching Center, a wireless network packet data network 102 that includes GPRS Support Nodes, EDGE Support Nodes, WCDMA Support Nodes, and other components, Radio Network Controllers/Base Station Controllers (RNC/BSCs) 152 and 154, and base stations/node Bs 103, 104, 105, and 106. The wireless network packet data network 102 couples to additional private and public packet data networks 114, e.g., the Internet, WANs, LANs, etc. A conventional voice terminal 121 couples to the PSTN 110. A Voice over Internet Protocol (VoIP) terminal 123 and a personal computer 125 couple to the Internet/WAN 114. The PSTN Interface 101 couples to the PSTN 110. Of course, this particular structure may vary from system to system.

Each of the base stations/node Bs 103-106 services a cell/set of sectors within which it supports wireless communications. Wireless links that include both downlink components and reverse link components support wireless communications between the base stations and their serviced wireless terminals. These wireless links support digital data communications, VoIP communications, and digital multimedia communications. The cellular wireless communication system 100 may also be backward compatible in supporting analog operations as well. The cellular wireless communication system 100 supports one or more of the UMTS/WCDMA standards, the Global System for Mobile telecommunications (GSM) standards, the GSM General Packet Radio Service (GPRS) extension to GSM, the Enhanced Data rates for GSM (or Global) Evolution (EDGE) standards, one or more Wideband Code Division Multiple Access (WCDMA) standards, and/or various other CDMA standards, TDMA standards and/or FDMA standards, etc.

Wireless terminals 116, 118, 120, 122, 124, 126, 128, and 130 couple to the cellular wireless communication system 100 via wireless links with the base stations/node Bs 103-106. As illustrated, wireless terminals may include cellular telephones 116 and 118, laptop computers 120 and 122, desktop computers 124 and 126, and data terminals 128 and 130. However, the cellular wireless communication system 100 supports communications with other types of wireless terminals as well. As is generally known, devices such as laptop computers 120 and 122, desktop computers 124 and 126, data terminals 128 and 130, and cellular telephones 116 and 118, are enabled to "surf" the Internet (packet data network) 114, transmit and receive data communications such as email, transmit and receive files, and to perform other data operations. Many of these data operations have significant download data-rate requirements while the upload data-rate requirements are not as severe. Some or all of the wireless terminals 116-130 are therefore enabled to support the EDGE operating standard, the GPRS standard, the UMTS/WCDMA standards, the HSDPA standards, the WCDMA standards, and/or the GSM standards.

Figure 2:
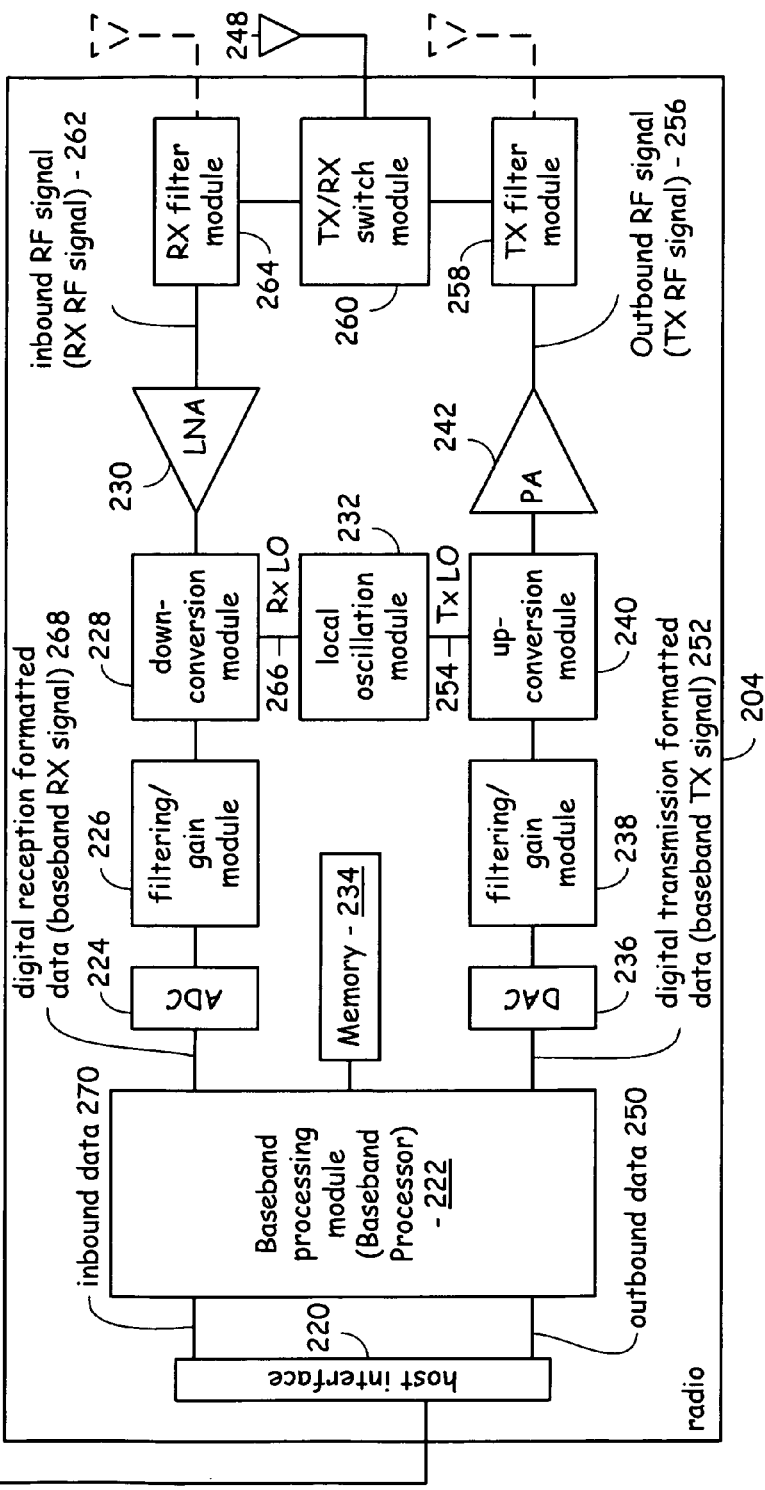
FIG. 2 is a block diagram functionally illustrating a wireless terminal constructed according to the present invention.

FIG. 2 is a block diagram functionally illustrating a wireless terminal constructed according to the present invention. The wireless terminal includes host processing components 202 and an associated radio 204. For cellular telephones, the host processing components and the radio 204 are contained within a single housing. In some cellular telephones, the host processing components 202 and some or all of the components of the radio 204 are formed on a single Integrated Circuit (IC). For personal digital assistants hosts, laptop hosts, and/or personal computer hosts, the radio 204 may reside within an expansion card or upon a mother board and, therefore, be housed separately from the host processing components 202. The host processing components 202 include at least a processing module 206, memory 208, radio interface 210, an input interface 212, and an output interface 214. The processing module 206 and memory 208 execute instructions to support host terminal functions. For example, for a cellular telephone host device, the processing module 206 performs user interface operations and executes host software programs among other operations.

The radio interface 210 allows data to be received from and sent to the radio 204. For data received from the radio 204 (e.g., inbound data), the radio interface 210 provides the data to the processing module 206 for further processing and/or routing to the output interface 214. The output interface 214 provides connectivity to an output display device such as a display, monitor, speakers, et cetera such that the received data may be displayed. The radio interface 210 also provides data from the processing module 206 to the radio 204. The processing module 206 may receive the outbound data from an input device such as a keyboard, keypad, microphone, et cetera via the input interface 212 or generate the data itself. For data received via the input interface 212, the processing module 206 may perform a corresponding host function on the data and/or route it to the radio 204 via the radio interface 210.

Radio 204 includes a host interface 220, baseband processing module 222 (baseband processor) 222, analog-to-digital converter 224, filtering/gain module 226, down conversion module 228, low noise amplifier 230, local oscillation module 232, memory 234, digital-to-analog converter 236, filtering/gain module 238, up-conversion module 240, power amplifier 242, RX filter module 264, TX filter module 258, TX/RX switch module 260, and antenna 248. Antenna 248 may be a single antenna that is shared by transmit and receive paths (half-duplex) or may include separate antennas for the transmit path and receive path (full-duplex). The antenna implementation will depend on the particular standard to which the wireless communication device is compliant.

The baseband processing module 222 in combination with operational instructions stored in memory 234, execute digital receiver functions and digital transmitter functions. The digital receiver functions include, but are not limited to, digital intermediate frequency to baseband conversion, demodulation, constellation demapping, descrambling, and/or decoding. The digital transmitter functions include, but are not limited to, encoding, scrambling, constellation mapping, modulation, and/or digital baseband to IF conversion. The transmit and receive functions provided by the baseband processing module 222 may be implemented using shared processing devices and/or individual processing devices. Processing devices may include microprocessors, microcontrollers, digital signal processors, microcomputers, central processing units, field programmable gate arrays, programmable logic devices, state machines, logic circuitry, analog circuitry, digital circuitry, and/or any device that manipulates signals (analog and/or digital) based on operational instructions. The memory 234 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 222 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 204 receives outbound data 250 from the host processing components via the host interface 220. The host interface 220 routes the outbound data 250 to the baseband processing module 222, which processes the outbound data 250 in accordance with a particular wireless communication standard (e.g., UMTS/WCDMA, GSM, GPRS, EDGE, et cetera) to produce digital transmission formatted data 252. The digital transmission formatted data 252 is a digital base-band signal or a digital low IF signal, where the low IF will be in the frequency range of zero to a few kilohertz/megahertz.

The digital-to-analog converter 236 converts the digital transmission formatted data 252 from the digital domain to the analog domain. The filtering/gain module 238 filters and/or adjusts the gain of the analog signal prior to providing it to the up-conversion module 240. The up-conversion module 240 directly converts the analog baseband or low IF signal into an RF signal based on a transmitter local oscillation 254 provided by local oscillation module 232. The power amplifier 242 amplifies the RF signal to produce outbound RF signal 256, which is filtered by the TX filter module 258. The TX/RX switch module 260 receives the amplified and filtered RF signal from the TX filter module 258 and provides the output RF signal 256 signal to the antenna 248, which transmits the outbound RF signal 256 to a targeted device such as a base station 103-106.

The radio 204 also receives an inbound RF signal 262, which was transmitted by a base station via the antenna 248, the TX/RX switch module 260, and the RX filter module 264. The low noise amplifier 230 receives inbound RF signal 262 and amplifies the inbound RF signal 262 to produce an amplified inbound RF signal. The low noise amplifier 230 provides the amplified inbound RF signal to the down conversion module 228, which converts the amplified inbound RF signal into an inbound low IF signal or baseband signal based on a receiver local oscillation 266 provided by local oscillation module 232. The down conversion module 228 provides the inbound low IF signal (or baseband signal) to the filtering/gain module 226, which filters and/or adjusts the gain of the signal before providing it to the analog to digital converter 224. The analog-to-digital converter 224 converts the filtered inbound low IF signal (or baseband signal) from the analog domain to the digital domain to produce digital reception formatted data 268. The baseband processing module 222 demodulates, demaps, descrambles, and/or decodes the digital reception formatted data 268 to recapture inbound data 270 in accordance with the particular wireless communication standard being implemented by radio 204. The host interface 220 provides the recaptured inbound data 270 to the host processing components 202 via the radio interface 210.

As the reader will appreciate, all components of the radio 204, including the baseband processing module 222 and the RF front end components may be formed on a single integrated circuit. In another construct, the baseband processing module 222 and the RF front end components of the radio 204 may be formed on separate integrated circuits. The radio 204 may be formed on a single integrated circuit along with the host processing components 202. In still other embodiments, the baseband processing module 222 and the host processing components 202 may be formed on separate integrated circuits. Thus, all components of FIG. 2 excluding the antenna, display, speakers, et cetera and keyboard, keypad, microphone, et cetera may be formed on a single integrated circuit. Many differing constructs integrated circuit constructs are possible without departing from the teachings of the present invention.

Components of the radio 204 may be enabled and disabled at differing operational time periods according to embodiments of the present invention. For example, the components making up the RF front end of the radio 204 may be turned off from time to time to save power, which results in extended battery life for a battery powered handheld device. When the radio 204 is neither transmitting nor receiving information but is performing processing on previously received information and/or information that is to be later transmitted, components of the RF front end of radio 204 may be turned off. In such case, the filtering/gain module 226, down conversion module 228, LNA 230, Rx filter module 264, Tx/Rx switch module 260, Tx filter module 258, PA 242, up conversion module 240, filtering/gain module 238 and/or local oscillation module 234 may be disabled to extend battery life. Typically, these components, referred to herein generally as RF front end components, are turned off when the radio 204 is neither transmitting nor receiving information. The ADC 224 and the DAC 236 may also be disabled when the RF front end components are not required for transmit or receive operations. However, the ADC 224 and the DAC 236 may be considered to be part of the baseband processing module 222 and remain turned on while the baseband processing module 222 is turned on.

According to one particular aspect of the present invention that will be described further herein with reference to FIGS. 6 and 8, RF front end components are selectively enabled and disabled based upon the ongoing operations of the radio 204. In such case, when the RF front end components are required to transmit or receive information they are enabled. Further, when they are not required to transmit and receive information they are fully or partially disabled. Because the radio 204, when supporting WCDMA operations, is required to continually monitor a received WCDMA signal to discover and measure the strengths of pilot signals of corresponding base stations, the baseband processing module 222 typically will perform these operations during most time periods. However, in order to reduce the number of circuit components of the radio 204 and to reduce power consumption, when the radio 204 is not actively transmitting or receiving information but is simply discovering pilot signals, a reduced power mode of operation may be used.

With this reduced power mode of operation, during a first time interval, the RF front end components of the receive path, e.g., 264-222 are enabled to receive a WCDMA RF signal of the first time interval. Further, these components of the RF front end receive path are operable to convert the WCDMA RF signal to a WCDMA baseband signal during the first time interval. The ADC 224 of the baseband processing module 222 (or separate from the baseband processing module 222), is operable to sample the WCDMA baseband signal during the first time interval to produce a plurality of samples of the WCDMA signal with first time intervals. These samples are stored in memory 234.

Then, operation proceeds to a second time interval during components of the RF front end are disabled. Herein, when discussing the disabling of the RF front end, the RF front end may be fully disabled or partially disabled. In any case, at least some of the RF front end components are disabled so that its full functionality is not enabled, in particular receive path functionality. During the second time interval, the baseband processing module 222 processes the plurality of samples of the WCDMA signal to measure signal strengths of a plurality of pilot signals present in the WCDMA signal. Then, during a third time interval with difference from both the first and second time intervals, the RF front end is enabled again to capture data contained in the WCDMA signal. These operations will be described more fully with reference to FIGS. 6, 7 and 8.

Figure 3:
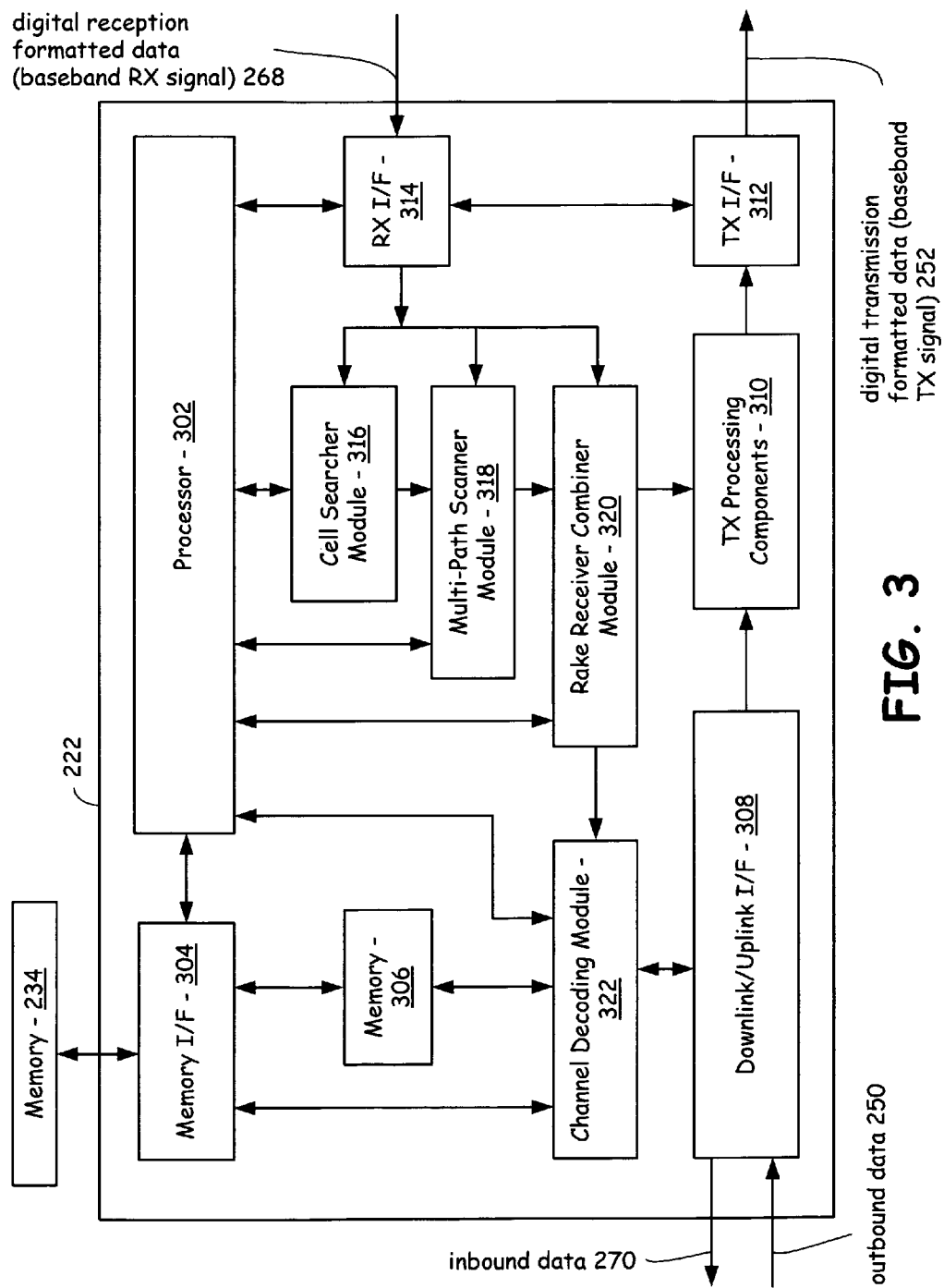
FIG. 3 is a block diagram illustrating components of a baseband processing module according to an embodiment of the present invention.

FIG. 3 is a block diagram illustrating components of a baseband processing module 222 according to an embodiment of the present invention. Components of baseband processing module 222 (baseband processor) 222 include a processor 302, a memory interface 304, onboard memory 306, a downlink/uplink interface 308, TX processing components 310, and a TX interface 312. The baseband processing module 222 further includes an RX interface 314, a cell searcher module 316, a multi-path scanner module 318, a rake receiver combiner module 320, and a channel decoding module 322. The baseband processing module 222 couples in some embodiments to external memory 234. However, in other embodiments, memory 306 services the memory requirements of the baseband processing module 222.

As was previously described with reference to FIG. 2, the baseband processing module 222 receives outbound data 250 from coupled host processing components 202 and provides inbound data 270 to the coupled host processing components 202. The baseband processing module 222 provides digital formatted transmission data (baseband TX signal) 252 to a coupled RF front end. The baseband processing module 222 receives digital reception formatted data (baseband RX signal) 268 from the coupled RF front end. As was previously described with reference to FIG. 2, an ADC 222 produces the digital reception formatted data (baseband RX data) 268 while the DAC 236 of the RF front end receives the digital transmission formatted data (baseband TX signal) 252 from the baseband processing module 222. The baseband processing module 222 may include the ADC 224 and DAC 236 described previously with reference to FIG. 2. However, the ADC 224 and the DAC 236 may be associated with the baseband processing module 222 but physically separate from the baseband processing module 222.

The downlink/uplink interface 308 is operable to receive the outbound data 250 from coupled host processing components, e.g., the host processing component 202 via host interface 220. The downlink/uplink interface 308 is operable to provide inbound data 270 to the coupled host processing components 202 via the host interface 220. As the reader will appreciate, the baseband processing module 222 may be formed on a single integrated circuit with the other components of radio 204. Alternately, the radio 204 (including the baseband processing module 222) may be formed in a single integrated circuit along with the host processing components 202. Thus, in such case, all components of FIG. 2 excluding the antenna, display, speakers, et cetera and keyboard, keypad, microphone, et cetera may be formed on a single integrated circuit. However, in still other embodiments, the baseband processing module 222 and the host processing components 202 may be formed on a separate integrated circuit. Many differing constructs integrated circuit constructs are possible without departing from the teachings of the present invention. TX processing component 310 and TX interface 312 communicatively couple to the RF front end as illustrated in FIG. 2 and to the downlink/uplink interface 308. The TX processing components 310 and TX interface 312 are operable to receive the outbound data from the downlink/uplink interface 304, to process the outbound data to produce the baseband TX signal 252 and to output the baseband TX signal 252 to the RF front end as was described with reference to FIG. 2.

The baseband processing module 222 may receive additional inputs and produce additional outputs to more than one RF front end. As is generally known, diversity path processing requires that an RF receiver of a wireless terminal or base station includes multiple antennas for transmit and receive diversity operations. In such case, each of these antennas may be serviced by a corresponding RF front end. When these multiple RF front ends are used, the baseband processing module 222 interfaces to each of the plurality of RF front ends to transmit data to and receive data from. The methodology of the present invention can be applied to RF receivers and transmitters having multiple RF front ends. Such will be the case by selectively enabling or disabling receive and/or transmit components of the RF front ends according to the principles previously described with reference to FIG. 2 and those will be described further with reference to FIGS. 6-8.

Figure 4A:
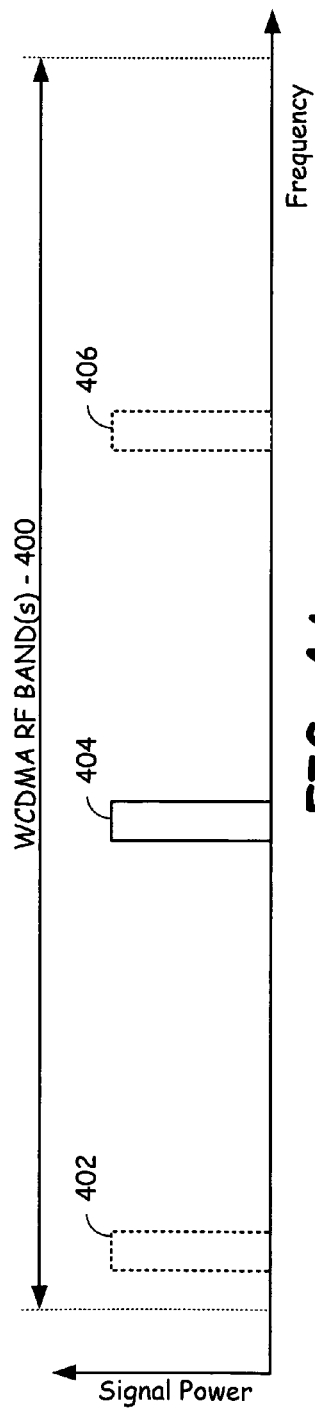
FIG. 4A is a graph illustrating diagrammatically the power spectral density of WCDMA RF band(s) supporting multiple RF carriers.

FIG. 4A is a graph illustrating diagrammatically the power spectral density of WCDMA RF band(s) 400 supporting multiple RF carriers 402, 404, and 406. The WCDMA RF band(s) 400 extend across a frequency spectrum and include WCDMA RF carriers 402, 404, and 406. According to one aspect of the present invention, the cell searcher module 316 of the baseband processing module 222 of an RF transceiver that supports WCDMA operations according to the present invention is operable to scan the WCDMA RF band(s) 400 to identify WCDMA RF energy of at least one WCDMA carrier 402, 404, or 406. During initial cell search operations, the cell searcher module 316 will, in combination with other components of the baseband processing module 222, identify a strongest WCDMA carrier, e.g., 404. Then, the cell searcher module 316 synchronizes to WCDMA signals within the WCDMA carrier 404. These WCDMA signals corresponding to a particular base station cell or sector. In these initial cell search synchronization operations, the cell searcher module 316 preferably synchronizes to a strongest cell/sector.

WCDMA signals transmitted from multiple base stations/sectors may use a common WCDMA RF carrier 404. Alternately, the WCDMA signals from differing base stations/sectors may use differing WCDMA carriers, e.g., 402 or 406. According to the present invention, the cell searcher module 316 and the baseband processing module 222 are operable to synchronize to WCDMA signals from differing cells/sectors operating in one or more of the WCDMA RF bands 402, 404, or 406. Such synchronization operations occur not only for initial cell search but for neighbor cell search or detected cell search operations.

Figure 4B:
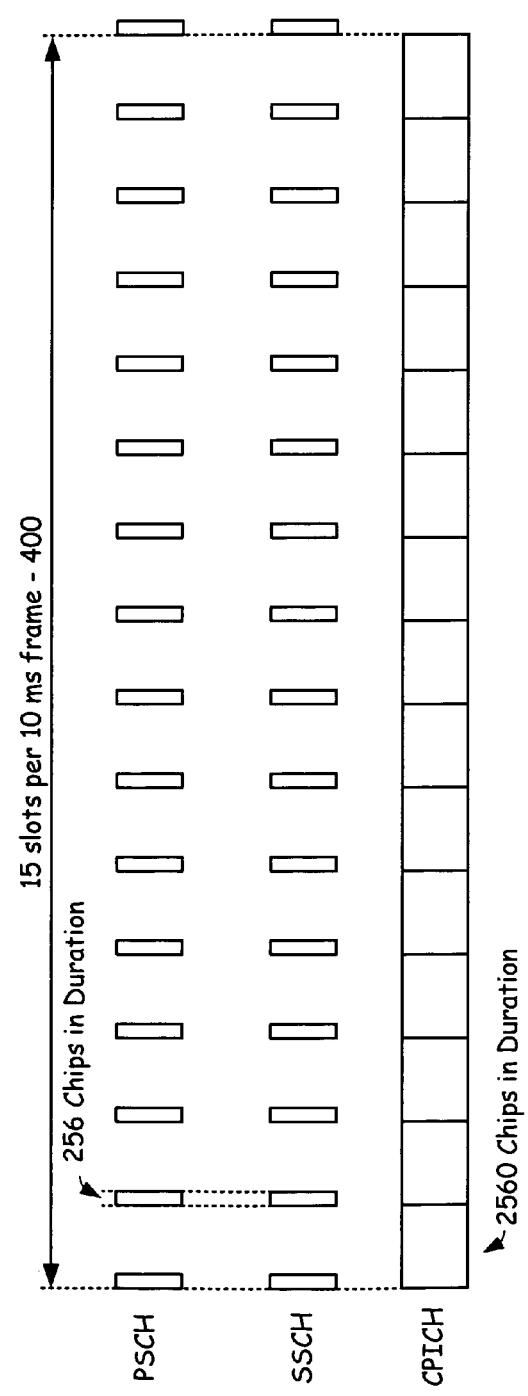
FIG. 4B is a block diagram diagrammatically illustrating the timing of various channels of a WCDMA system employed for cell searching and base station synchronization according to the present invention.

FIG. 4B is a block diagram diagrammatically illustrating the timing of various channels of a WCDMA system employed for cell searching and base station synchronization according to the present invention. The WCDMA signal illustrated has a 15 slot frame structure that extends across 10 ms in time. The WCDMA signal includes a Synchronization Channel (SCH) and a Common Pilot Channel (CPICH), which are introduced in the downlink to assist wireless transceivers in performing cell search operations. The SCH is further split into a primary SCH (PSCH) and a secondary SCH (SSCH). The PSCH carries a primary synchronization code (PSC) which is chosen to have good periodic auto correlation properties and the secondary SCH (SSCH) carries a secondary synchronization code (SSC). The PSCH and the SSCH are constructed such that their cyclic-shifts are unique so that reliable slot and frame synchronization can be achieved. The PSCH and the SSCH are 256-chips long with special formats and appear $\frac{1}{10}$ of each time slot. During the rest of the time slot, the Primary Common Control Physical Channel (P-CCPCH) is transmitted. As shown in FIG. 4A, the PSCH and the SSCH are transmitted once in the same position in every slot. The PSCH code is the same for all time slots, and therefore is used to detect slot boundary. The SSCH is used to identify scrambling code group and frame boundary. Thus, the SSCH sequences vary from slot to slot and are coded by a code-book with 64 code-words (each representing a code-group). The CPICH carries pre-defined symbols with a fixed rate (30 kbps, hence 10 symbols per time slot) and spreading factor of 256. The channelization code for CPICH is fixed to the $0^{th}$ code.

FIG. 5A is a graph illustrating an example of a multi-path delay spread at a first time, T1. As is known, in wireless communication systems, a transmitted signal may take various routes in propagating from an RF transmitter to an RF receiver. Referring briefly again to FIG. 1, transmissions from base station 103 to wireless terminal 116 may take multiple paths with each of these multiple paths arriving in a corresponding time frame. These multiple received copies of the transmitted signal are typically referred to as "multi-path" signal components. Referring again to FIG. 5A, an example of a delay spread that includes multi-path components and their corresponding signal strength for time T1 is shown.

Serving cell signal components include multi-path components 508, 510, 512, and 514 that are received at respective times with respect to a periodic reference time. Neighbor cell signal components include multi-path signal components 516, 518, and 520. Note that the serving cell signal components 504 and neighbor cell signal components arrive at differing times with respect to the periodic reference time since they are not time aligned. As is known, multi-path components of the propagation channel results in signal arrive at the RF receiver at different times. As is also known, the number of received multi-path components and the signal strength and signal to interference ratio of each multi-path component varies over time.

FIG. 5B is a graph illustrating the example of the multi-path delay spread of FIG. 5A at a second time, T2. Because the characteristics of the channel from the RF transmitter to the RF receiver changes over time so does serving cell path signal components 504 and neighbor cell signal components 506. Thus, for example, the multi-path component 508 of FIG. 5B, while having the same time relationship to the periodic reference time as multi-path component 508 as shown in FIG. 5A, has a greater signal-to-interference ratio or signal-to-noise ratio than it did in FIG. 5A. Further, multi-path component 510 is missing, multi-path component 512 is smaller in magnitude, and multi-path component 514 is greater in magnitude than are their counterparts of FIG. 5B. In addition, serving cell signal components 504 include a new multi-path component 552 that is existent at time T2 but it was not existent at time T1.

The neighbor cell multi-path signal component 506 at time T2 of FIG. 5B also differ from those at time T1 of FIG. 5A. In such case, multi-path components 516 and 518 have differing magnitudes at time T2 than they did at time T1. Further, multi-path component 520 which was strong at time T1 does not exist at time T2. Moreover, new multi-path component 554 at time T2 exists where it did not exist at time T1. The cell searcher module 316, multi-path scanner module 318, and rake receiver module 320 track the existence of these multi-path components, synchronize to some of these multi-path components, and receive data via at least some of these multi-path components.

Figure 6:
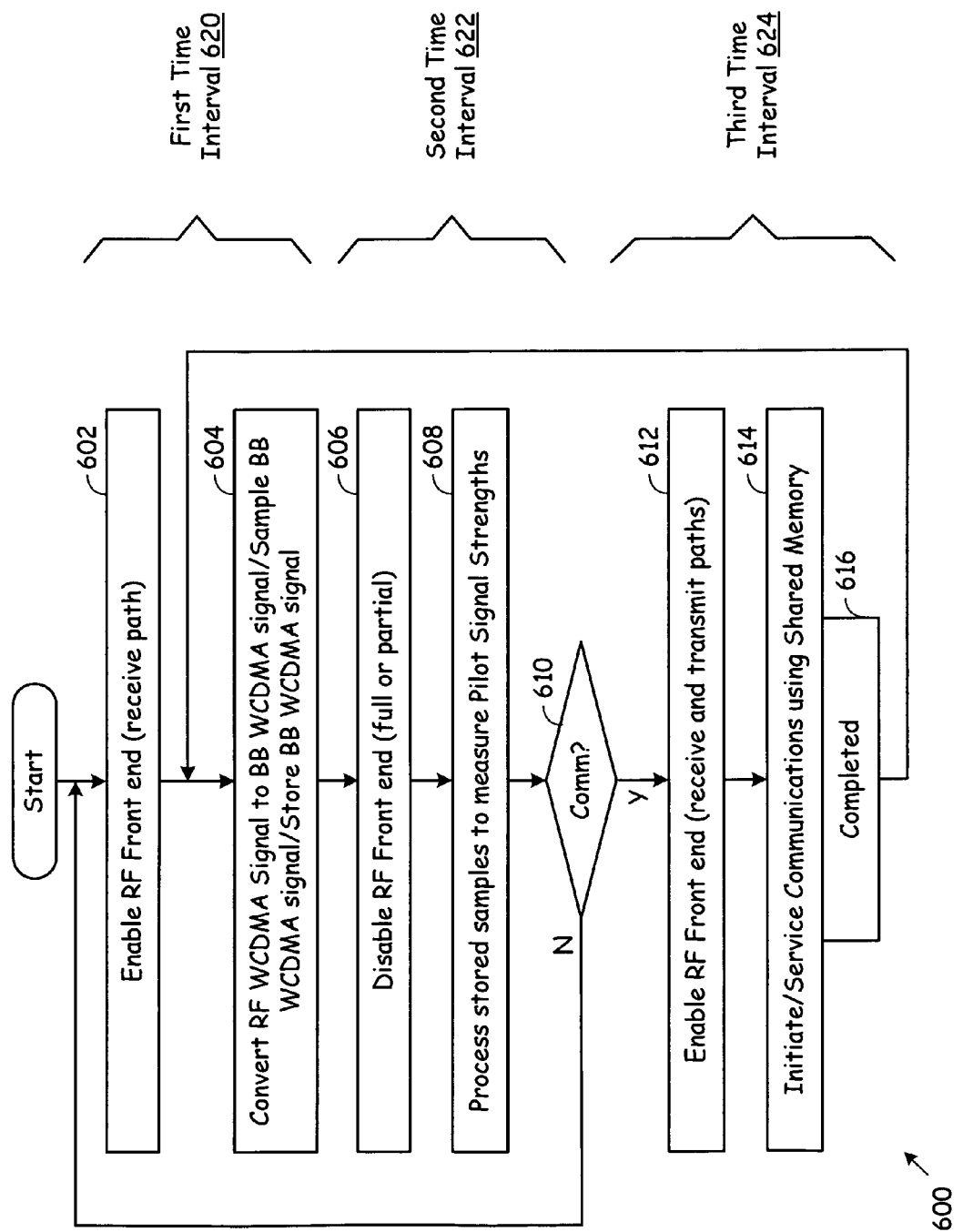
FIG. 6 is a flow chart illustrating operations of a wireless terminal in searching for, finding, synchronizing to, and receiving data from a base station according to an embodiment of the present invention.

FIG. 6 is a flow chart illustrating operations of a wireless terminal in searching for, finding, synchronizing to, and receiving data from a base station according to an embodiment of the present invention. The operation 600 of FIG. 6 commences with the wireless terminal enabling or turning on an RF front end of its RF receiver (Step 602). The operations are performed during a first time interval 620. At Step 602, the receive path components of the RF front end are enabled even though some of the components of the RF front end, such as the transmit components of the RF front end, may be disabled. Thus, at Step 602, the receive path components of the RF front end are enabled to receive a Wideband Code Division Multiple Access (WCDMA) RF signal of the first time interval 620. Then, operation includes performing an RF sweep of WCDMA bands of the WCDMA RF signal to detect WCDMA energy (Step 604). The operations of Step 604 are also performed in the first time interval 620. Also performed at Step 604 is the operation of converting the WCDMA RF signal to a WCDMA baseband signal on the first time interval. Further, the operation at Step 604 includes sampling the WCDMA baseband signal on the first time interval to produce a plurality of samples of the WCDMA signal of the first time interval 620. Finally, at Step 604, the operation includes storing the plurality of samples of the WCDMA signal of the first time interval 620 in memory.

Then, the operation includes disabling at least a portion of the RF front end of the RF receiver at the beginning of a second time interval 622. Disabling the RF front end of the RF receiver may include fully or partially disabling RF front end components that were described previously with reference to FIG. 2. Thus, the operation at Step 606 may include disabling RF front end receive path components, all or some of RF transmit path components, and/or all of both of the RF receive path and RF transmit path components of the RF front end. The operations at Step 606 of the second time interval 622 may further include disabling one or both of the ADC 224 and the DAC 236 that were illustrated in FIG. 2. Operation continues during the second time interval 622 at Step 608 with processing the plurality of samples of the WCDMA signal of the first time interval in order to measure signal strengths of a plurality of pilot signals present in the WCDMA signal of the first time interval. In such case, each of the plurality of pilot signals corresponds to a WCDMA RF transmitter.

Operation continues to Step 610 wherein the wireless device determines whether a communication is to be serviced (Step 610). If no communication is to be serviced, operation returns to Step 602 from Step 610. However, if communication is to be serviced, as determined at Step 610, the wireless terminal enables the RF front end of its RF receiver (RF transceiver) to perform communication operations. Typically at Step 610, the wireless terminal enables both receive and transmit paths of the RF front end so that they can service both receive and transmit communications. The operations of Step 612 correspond to a third time interval that differs from both the first time interval and the second time interval. Then, the RF device initiates and services communications using a shared memory (Step 614) during the third time interval 624. The manner in which the shared memory is used will be described further with reference to FIG. 6. The operations of Step 614 include receiving a WCDMA RF signal of the third time interval 624 and converting the WCDMA RF signal of the third time interval to a WCDMA baseband signal third time interval 624. The operation of Step 614 further includes sampling the WCDMA signal of the third time interval 624 to produce a plurality of samples of the WCDMA signal of the third time interval 624. Then, operation includes storing the plurality of samples of the WCDMA signal of the third time interval in memory and processing the plurality of symbol samples of the WCDMA signal of the third time interval to extract data there from. The operations of Step 614 during the third time interval 624 continue until the communication is completed (as determined at Step 616). From Step 616, operation returns to Step 604 wherein the RF device continues to scan for pilot signals.

The manner in which the shared memory is employed to store a plurality of samples will be described further with reference to FIG. 8. For example, referring to both FIG. 2 and FIG. 6, memory 234 may be employed to store differing information during the first time interval 620 and the third time interval 624. In such case, efficiencies in the use of memory 234 reduce energy consumption and the cost of the wireless terminal because of reduced memory requirements. As was previously described with reference to FIG. 3, processing the plurality of samples of the WCDMA signal of the first time interval 620 may be performed by a cell searcher module 316. In such case, the cell searcher module performs the operations of Step 608 of FIG. 6. Further, in initiating and servicing communications using the shared memory at Step 614, a rake receiver combiner module 320, as previously described with reference to FIG. 3, may be used. In such case, the rake receiver module 320 processes information received from the cell searcher module 316 and/or a multi-path scanner module 318 to locate multi-path components of the WCDMA signal. The rake receiver combiner module 320 operates on a plurality of multi-path components of the WCDMA signal of the third time interval 624 identified by the cell searcher module 316 and the multi-path scanner module 318.

Note that the operations 602-616 are shown to be performed during particular time intervals. According to the present invention, these time intervals 620, 622, and/or 624 may overlap. That is, some of operations 604, 606, and/or 608 may occur during both the first time interval 620 and the second time interval 622. For example, while the RF Front end is enabled (step 602), processing of the stored samples (step 608) may occur. Then, while the operations of step 608 are ongoing, the operations of step 604 are completed and the operations of step 606 are performed to disable the RF Front end (step 606). Further, note that the operations of the present invention apply to communication systems other than WCDMA systems, as well.

Figure 7:
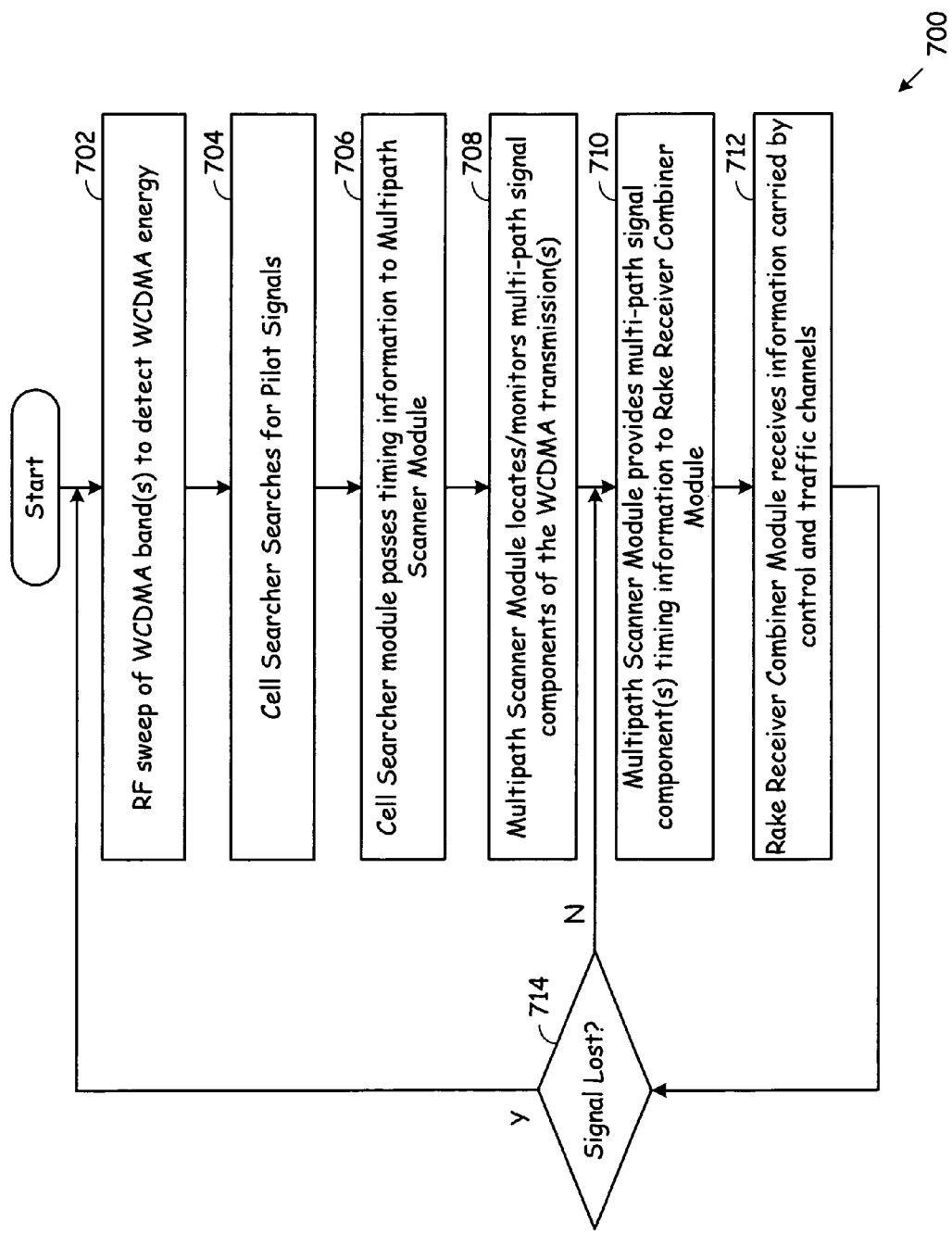
FIG. 7 is a flow chart illustrating generally operations of a wireless terminal in searching for, finding, synchronizing to, and receiving data from a base station according to another embodiment of the present invention.

FIG. 7 is a flow chart illustrating generally operations of a wireless terminal in searching for, finding, synchronizing to, and receiving data from a base station according to another embodiment of the present invention. The operations 700 of FIG. 7 are performed by the cell searcher module 316, the multi-path scanner module 318, and the rake receiver module 320 of the baseband processing module 222 of the radio 204 of a wireless terminal constructed according to the present invention. The operations 700 are initiated upon start-up or reset or when the RF terminal is otherwise detecting a serving cell within a WCDMA system. Operation commences with the RF transceiver performing an RF sweep of WCDMA RF bands to detect WCDMA energy (Step 702). The RF sweep of the WCDMA RF bands is a collective effort between the RF front-end components of the RF transceiver radio 204 shown in FIG. 2 as well as the baseband processing module 222 of the radio 204 of FIG. 2. Referring to FIG. 7 and FIG. 3 jointly, in making the RF sweep of the WCDMA RF bands to detect WCDMA energy, the RF front-end tunes to various RF channels within the WCDMA RF bands 400 as shown and discussed with reference to FIG. 4A. With particular references to the components of the baseband processing module 222, the cell searcher module 316 may interact with the processor 302 in order to detect WCDMA energy during the RF sweep of the WCDMA RF bands.

After this RF sweep has been completed at Step 702, the processor 302, in cooperation with the cell searcher module 316 and the RF front-end components, identifies a particular RF band, e.g., 404 of FIG. 4A, in which to detect and synchronize to a WCDMA signal. The cell searcher module 316 of the baseband processing module 222 searches for pilot signals (Step 704). In performing its initial cell search operations, the cell searcher module 316 acquires slot synchronization to the WCDMA signal, acquires frame synchronization to and identifies a code group of the received WCDMA signal based upon correlation with the SSCH of the WCDMA signal and then identifies the scrambling code of the WCDMA signal based upon correlation with the CPICH of the WCDMA signal.

Operation continues with the cell searcher module 316 passing the timing and scrambling code information to the multi-path scanner module 318 (Step 706). This information may be passed directly or via the processor 302. The multi-path scanner module 318 then locates and monitors multi-path signal components of the WCDMA transmissions (Step 708). The multi-path scanner module 318 then provides the multi-path component timing information to the rake receiver combiner module 320 (Step 710). This information may be passed directly or via the processor 302. The rake receiver combiner module 320 then receives information carried by control and traffic channels of the WCDMA signal of the serving cell/sector (Step 712). The RF transceiver continues to receive control and traffic channel information from a serving cell until it decides to either find a new serving cell via neighbor search operations, it loses the signal from the serving cell, or upon another operational determination in which it decides to either terminate receipt of the signal from the serving cell or the carrier is lost. When the signal is lost (Step 714) or in another situation which the RF transceiver decides to move to a different RF carrier, operation proceeds again to Step 702. However, if the RF transceiver determines that continued operation of the particular RF carrier and for the particular serving cell should continue, operation continues to Step 710 again.

According to the present invention, the operations of Step 702 may be during the first time interval while the operations of Steps 704 may be during the second time interval. Further, the operations of Steps 706 and 708 may be during the second time interval. Alternately, the operations of Steps 706 and 708 as well as steps 710 and 712 may be during the third time interval. In any case, according to the present invention, some RF front end components are disabled to reduce power consumption during correlation operations of Step 704.

Figure 8:
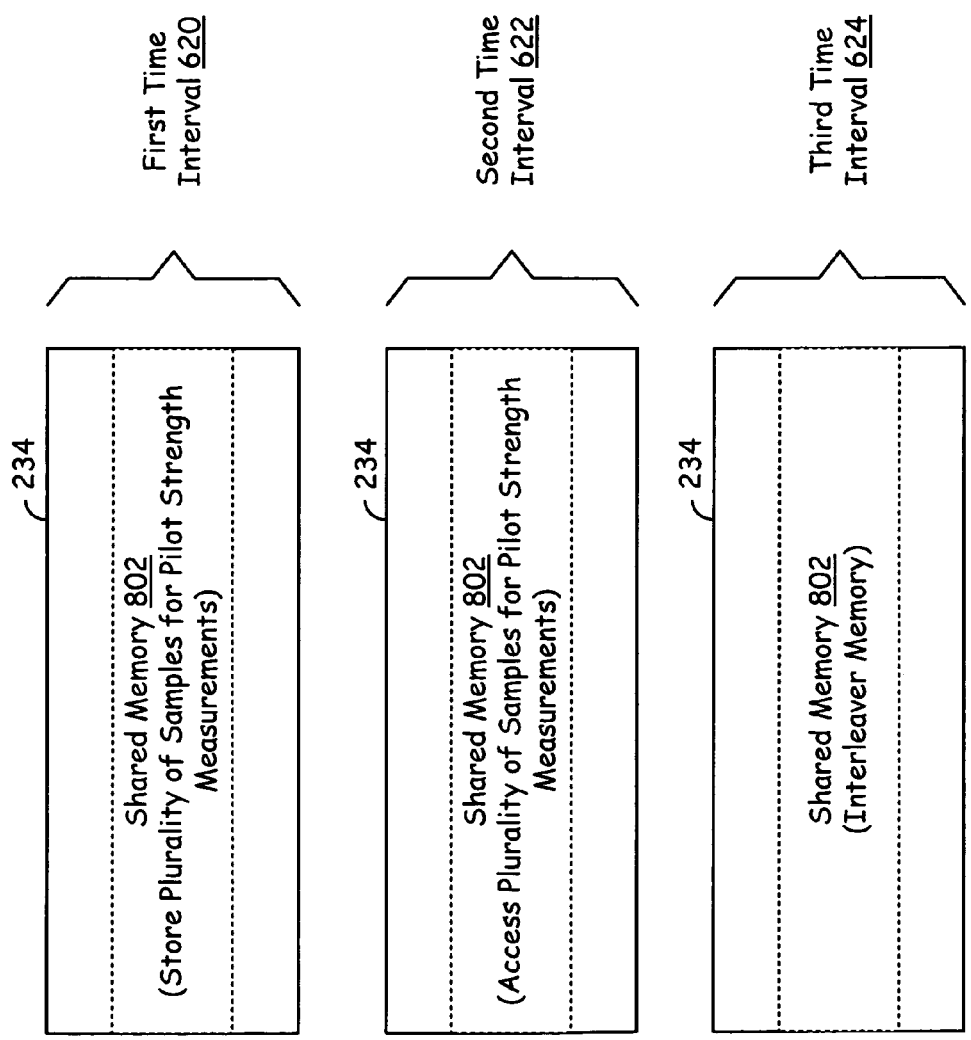
FIG. 8 is a block diagram illustrating shared memory operations of an RF receiver of a wireless terminal according to an embodiment of the present invention.

FIG. 8 is a block diagram illustrating shared memory operations of an RF receiver of a wireless terminal according to an embodiment of the present invention. As shown in FIG. 8, a memory 234, previously described with reference to FIG. 2, has a shared memory component 802. During the first time interval 620, the shared memory 802 is used to store a plurality of samples therein for pilot strength measurement operations. Then, during the second time interval 622, the plurality of samples for pilot strength measurement operations are accessed from the shared memory 802 and processed by cell searcher module 316, for example. Then, during the third time interval, when communication is being serviced by a radio frequency device of the present invention, the plurality of samples that were employed for pilot strength measurement operations in the second time interval 622 are purged and the shared memory 802 is used for interleaver memory storage.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A method for operating a Radio Frequency (RF) receiver that has an RF front end and a baseband processing module, the method comprising:
    during a first time interval:
        enabling the RF front end to receive an RF signal of the first time interval;
        converting the RF signal to a baseband signal of the first time interval;
        sampling the baseband signal of the first time interval to produce a plurality of samples of the baseband signal of the first time interval; and
        storing the plurality of samples of the baseband signal of the first time interval in memory;
    during a second time interval that differs from the first time interval:
        disabling the RF front end;
        processing the plurality of samples of the baseband signal of the first time interval to measure signal strengths of a plurality of pilot signals present in the RF signal of the first time interval, wherein the plurality of samples are processed a plurality of times, each processing time corresponding to a search for a pilot signal of a differing RF transmitter; and
    during a third time interval that differs from both the first time interval and the second time interval:
        enabling the RF front end;
        receiving an RF signal of the third time interval;
        converting the RF signal of the third time interval to a baseband signal of the third time interval;
        sampling the baseband signal of the third time interval to produce a plurality of samples of the baseband signal of the third time interval;
        storing the plurality of samples of the baseband signal of the third time interval in memory; and
        processing the plurality of samples of the baseband signal of the third time interval to extract data there from, wherein:
            during the first time interval, the plurality of samples of the baseband signal of the first time interval are stored in a shared memory that comprises pilot signal search memory;
            during the second time interval, the plurality of samples of the baseband signal of the first time interval remain stored in the shared memory that comprises the pilot signal search memory; and
            during the third time interval, the plurality of samples of the baseband signal of the first time interval are evicted from the shared memory and the plurality of samples of the baseband signal of the third time interval are stored in the shared memory that comprises interleaver memory.

2. The method of claim 1, wherein:
    the RF signal is a Wideband Code Division Multiple Access (WCDMA) RF signal;
    the baseband signal is a WCDMA baseband signal; and
    each pilot signal corresponds to a multipath component of the WCDMA RF signal.

3. The method of claim 1, wherein the first time interval and the second time interval partially overlap such that the RF front end is enabled during a portion of the second time interval.

4. The method of claim 1, wherein processing the plurality of samples of the baseband signal of the first time interval to measure signal strengths of a plurality of pilot signals present in the baseband signal of the first time interval is performed by a cell searcher module.

5. The method of claim 1, wherein processing the baseband signal of the third time interval to extract data there from is performed by a rake receiver combiner module.

6. The method of claim 1, wherein:
    processing the baseband signal of the third time interval further comprises locating a plurality of multi-path components of the baseband signal of the third time interval; and
    processing the baseband signal of the third time interval to extra data there from further comprises rake processing the plurality of multi-path components of the baseband signal of the third time interval.

7. A Radio Frequency (RF) receiver comprising:
    a RF front end; and
    a baseband processing module coupled to the RF front end, wherein:
during a first time interval:
    the RF front end is operable to receive a an RF signal of the first time interval and to convert the RF signal to a baseband signal of the first time interval; and
    the baseband processing module is operable to sample the baseband signal of the first time interval to produce a plurality of samples of the baseband signal of the first time interval and to store the plurality of samples of the baseband signal of the first time interval in memory;
during a second time interval that differs from the first time interval:
    the RF front end is disabled; and
    the baseband processing module is operable to process the plurality of samples of the baseband signal of the first time interval to measure signal strengths of a plurality of pilot signals present in the baseband signal of the first time interval, wherein each pilot signal corresponds to a respective RF transmitter, wherein the plurality of samples are processed a plurality of times, each processing time corresponding to a search for a pilot signal of a differing RF transmitter; and during a third time interval that differs from both the first time interval and the second time interval:
the RF front end is operable to capture an RF signal of the third time interval and to convert the RF signal of the third time interval to a baseband signal of the third time interval;
the baseband processing module is operable to sample the baseband signal of the third time interval to produce a plurality of samples of the baseband signal of the third time interval and to process the baseband signal of the third time interval to extract data there from, wherein:
the memory comprises a shared memory;
during the first time interval, the plurality of samples of the baseband signal of the first time interval are stored in the shared memory;
during the second time interval, the plurality of samples of the baseband signal of the first time interval remain stored in the shared memory; and
during the third time interval, the plurality of samples of the baseband signal of the first time interval are evicted from the shared memory and the plurality of samples of the baseband signal of the third time interval are stored in the shared memory,
wherein the shared memory comprises:
pilot signal search memory during the first time interval and the second time interval; and
interleaver memory during the third time interval.

8. The RF receiver of claim 7, wherein:
the RF signal is a Wideband Code Division Multiple Access (WCDMA) RF signal;
the baseband signal is a WCDMA baseband signal; and
each pilot signal corresponds to a multipath component of the WCDMA RF signal.

9. The RF receiver of claim 7, wherein the first time interval and the second time interval partially overlap such that the RF front end is enabled during a portion of the second time interval.

10. The RF receiver of claim 7, wherein the baseband processing module comprises a cell searcher module that is operable to process the plurality of samples of the baseband signal of the first time interval to measure signal strengths of a plurality of pilot signals present in the baseband signal of the first time interval.

11. The RF receiver of claim 7, wherein the baseband processing module comprises a rake receiver combiner module that is operable to process the baseband signal of the third time interval to extract data there from.

12. The RF receiver of claim 7, wherein the baseband processing module comprises:
a multi-path scanner module that is operable to process the baseband signal of the third time interval to locate a plurality of multi-path components of the baseband signal of the third time interval; and
a rake receiver combiner module that is operable to process the plurality of multi-path components of the baseband signal of the third time interval to extra data there from.

* * * * *

UNITED STATES PATENT AND TRADEMARK OFFICE
CERTIFICATE OF CORRECTION

| | | |
|---|---|---|
| PATENT NO. | : 7,756,193 B2 | Page 1 of 1 |
| APPLICATION NO. | : 11/524585 | |
| DATED | : July 13, 2010 | |
| INVENTOR(S) | : Louis Jacobus Botha et al. | |

It is certified that error appears in the above-identified patent and that said Letters Patent is hereby corrected as shown below:

Col. 14, line 47, in claim 7, after "receive", delete "a"

Col. 16, line 29, replace "extra" with --extract--

Signed and Sealed this
First Day of May, 2012

David J. Kappos
*Director of the United States Patent and Trademark Office*